(12) United States Patent
Peret

(10) Patent No.: US 7,158,708 B2
(45) Date of Patent: Jan. 2, 2007

(54) METHOD OF METALLIZING NON-CONDUCTIVE SUBSTRATES AND METALLIZED NON-CONDUCTIVE SUBSTRATES FORMED THEREBY

(75) Inventor: Timothy J. Peret, Rutland, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 11/023,763

(22) Filed: Dec. 28, 2004

(65) Prior Publication Data

US 2005/0141836 A1 Jun. 30, 2005

Related U.S. Application Data

(60) Provisional application No. 60/533,689, filed on Dec. 31, 2003.

(51) Int. Cl.
*G02B 6/02* (2006.01)
(52) U.S. Cl. .................. 385/128; 385/123; 385/126; 385/127; 427/163.2
(58) Field of Classification Search ............... 385/123, 385/126–128
See application file for complete search history.

(56) References Cited

U.S. PATENT DOCUMENTS

| | | | |
|---|---|---|---|
| 5,178,916 A | 1/1993 | Chidsey et al. | |
| 5,380,559 A | 1/1995 | Filas et al. | |
| 5,774,615 A | 6/1998 | Uda et al. | |
| 5,853,797 A | 12/1998 | Fuchs et al. | |
| 6,251,252 B1 | 6/2001 | Chen | |
| 6,355,301 B1 | 3/2002 | Miller | |
| 2003/0039458 A1* | 2/2003 | Miller et al. | 385/128 |
| 2003/0173226 A1 | 9/2003 | Grunwald | |
| 2003/0206706 A1* | 11/2003 | Nemirovsky et al. | 385/128 |

OTHER PUBLICATIONS

Metal Finishing Guidebook & Directory; vol. 84, No. 1A, 1986, pp. 346-386.
Law et al.; "Processing Considerations on Providing Corrosion Protection for Gold-flashed Electrical Contacts"; The Proceedings of the 84th AESF Annual Technical Conference SUR/FIN '97; Jun. 23-26, 1997; Published by the AESF.

* cited by examiner

*Primary Examiner*—Jennifer Doan
(74) *Attorney, Agent, or Firm*—Jonathan D. Baskin

(57) ABSTRACT

Provided are methods of metallizing non-conductive substrates. The methods involve: (a) providing a non-conductive substrate having an exposed non-conductive surface; (b) forming a transition metal layer over the non-conductive surface; and (c) exposing the transition metal layer to a liquid solution of a compound chosen from one or more phosphonic acids and their salts, and monoesters of phosphoric acids and their salts, having 6 or more carbon atoms. The non-conductive substrate can be, for example, an optical fiber. Also provided are metallized non-conductive substrates and metallized optical fibers prepared by the inventive methods, as well as optoelectronic packages that include such metallized optical fibers. Particular applicability can be found in the optoelectronics industry in metallization of optical fibers and in the formation of hermetic optoelectronic device packages.

15 Claims, 1 Drawing Sheet

METHOD OF METALLIZING NON-CONDUCTIVE SUBSTRATES AND METALLIZED NON-CONDUCTIVE SUBSTRATES FORMED THEREBY

CROSS-REFERENCE TO RELATED APPLICATIONS

This application claims the benefit under 35 U.S.C. § 119(e) of U.S. Provisional Application No. 60/533,689, filed Dec. 31, 2003, the entire contents of which are incorporated herein by reference.

BACKGROUND OF THE INVENTION

This invention relates to methods of metallizing non-conductive substrates. The invention also relates to non-conductive substrates having a metallized surface. Particular applicability can be found in the optoelectronics industry in metallizing optical fibers and in the formation of hermetic optoelectronic device packages which include a metallized optical fiber.

Signal transmission using pulse sequences of light is becoming increasingly important in high-speed communications. Optical fibers have been a cornerstone in the infrastructure required for optical communications. The optical fibers are typically connected to optoelectronic components such as laser diodes, light emitting diodes (LEDs), photodetectors, modulators, and the like, in a device package. The resulting glass-to-metal connection between the optical fiber and package creates a hermetically sealed structure. Hermetic packages provide for containment and protection of the enclosed devices, which are typically sensitive to environmental conditions. In this regard, degradation in operation of optical and optoelectronic components may be caused by atmospheric contaminants such as humidity, dust, chemical vapors, and free ions. The optical input/output surfaces of the components in the package are especially susceptible to contamination while metallic surfaces of the package are susceptible to corrosion. Both of these effects can give rise to reliability problems. Hermetic sealing of the package to prevent contact with the outside atmosphere is thus desired.

To allow bonding of the optical fiber to an optoelectronic device package and formation of a hermetic seal, a metal structure is formed on the non-conductive, silica surface of the optical fiber. Several techniques for metallizing optical fibers are known in the art. For example, physical vapor deposition (PVD) techniques such as sputtering and evaporation, electroless plating, and a combination of electroless and electrolytic plating techniques have been proposed. Typical metal structures employed in fiber metallization include one or more nickel layer in combination with one or more additional metal layer such as gold. U.S. Pat. No. 6,251,252, for example, discloses formation of a first, electroless nickel layer on the optical fiber silica surface, a second, electrolytic nickel layer on the first nickel layer, and an electrolytic gold layer on the second nickel layer.

When nickel is used as the outer metal, solderability of the fiber becomes greatly reduced due to oxide formation at the nickel surface. The gold cap layer over the nickel is used as a result of nickel's propensity to oxidize, in an effort to maintain a solderable finish. The use of gold alone, however, is not completely satisfactory in eliminating solderability issues. In this regard, gold is a porous material and may not totally prevent oxidation of an underlying nickel surface, particularly when present as a very thin film. Depending on the gold thickness, these oxidized nickel areas may protrude above the surface of the gold. In addition, exposed nickel areas may remain even after gold formation due to coating uniformity issues, which areas are readily oxidized. Additional problems may arise as a result of the porosity of nickel and gold. In this regard, water vapor may pass from the atmosphere through the gold and nickel layers to the fiber clad. The water vapor can lead to microcrack formation in the fiber, resulting in optical loss and other reliability issues.

There is thus a continuing need in the art for improved methods of forming metallized fibers that overcome or conspicuously ameliorate one or more of the foregoing problems associated with the state of the art.

SUMMARY OF THE INVENTION

In accordance with a first aspect, the present invention provides methods of metallizing non-conductive substrates. The methods involve: The methods involve:
(a) providing a non-conductive substrate having an exposed non-conductive surface;
(b) forming a transition metal layer over the non-conductive surface; and (c) exposing the transition metal layer to a liquid solution of a compound chosen from one or more phosphonic acids and their salts, and monoesters of phosphoric acids and their salts, having 6 or more carbon atoms. The non-conductive substrate can be, for example, an optical fiber.

In accordance with further aspects, the present invention provides metallized non-conductive substrates and metallized optical fibers prepared by the inventive methods.

In accordance with a further aspect, the present invention provides optoelectronic packages that include a metallized optical fiber prepared by the inventive methods.

Other features and advantages of the present invention will become apparent to one skilled in the art upon review of the following description, claims, and drawings appended hereto.

BRIEF DESCRIPTION OF THE DRAWINGS

The present invention will be discussed with reference to the following drawings, in which like reference numerals denote like features, and in which.

DETAILED DESCRIPTION OF THE INVENTION

The present invention provides methods of metallizing non-conductive substrates such as optical fibers, lenses, other optical elements, and non-conductive substrates in general. While the methods of the invention will be described with reference to optical fiber metallization, it should be clear that the principles are more broadly applicable to metallization of nonconductive substrates in general. Typical nonconductive substrate materials include, for example, thermosetting or thermoplastic resins, silica, doped silica, glass and doped glass. While various processes are discussed in terms of immersion of the optical fiber into chemical baths, other techniques for contacting the fiber with chemicals are envisioned, for example, by spraying the chemicals in liquid or atomized form. As used herein, the terms "a" and "an" mean one or more.

Briefly, the methods of the invention involve providing a non-conductive substrate having an exposed non-conductive surface, forming a transition metal layer over the non-conductive surface, and exposing the transition metal layer to a liquid solution of a chemical compound chosen from one or more phosphonic acids and salts thereof having 6 or more carbon atoms. The methods allow for metallization of optical fibers, making them solderable to other components and device packages such as hermetic packages. Metallized structures such as optical fibers having good solderability properties can result from the methods.

Figure 1:
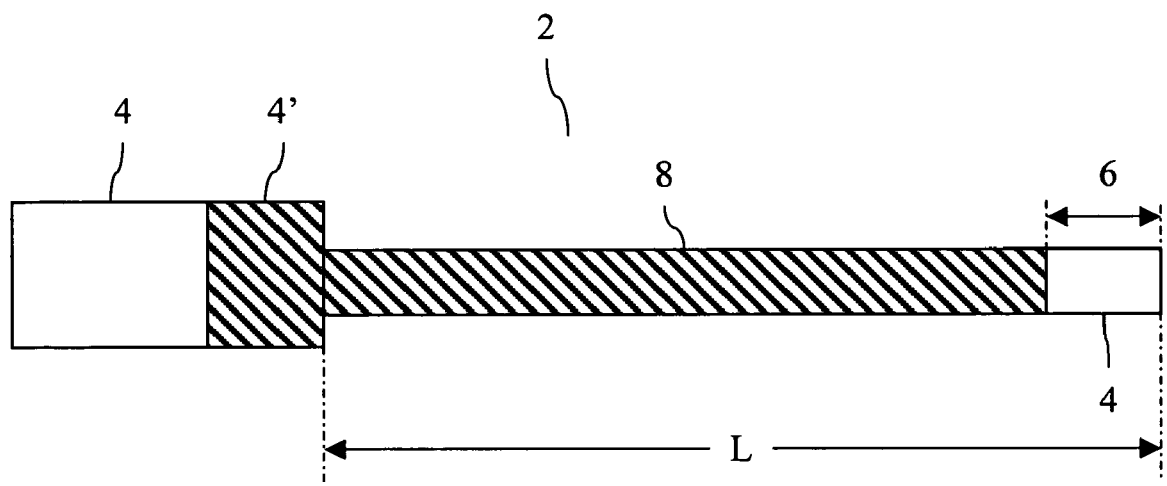
FIG. 1 illustrates an exemplary metallized optical fiber formed in accordance with one aspect of the invention.

With reference to FIG. 1, which illustrates an exemplary metallized optical fiber 2 formed in accordance with one aspect of the invention, the optical fiber to be metallized includes a core surrounded by a clad, both typically formed of a glass, e.g., silica. Typically, a polymeric jacket 4, such as an acrylate, surrounds the clad. In preparation of metallization, a desired length L of the polymeric jacket is stripped from that portion of the fiber to be metallized, thereby exposing the glass surface of the clad. The portion of the fiber to be metallized is typically an end portion, but may be another portion, for example, a central portion of the fiber. In certain circumstances, for example, continuous reel-to-reel-type processes, it may be desirable to strip the jacket from the entire length of the fiber (alternatively, a jacket-free fiber may be used in this instance). Mechanical and/or chemical stripping techniques may be employed. Chemical stripping may be more beneficial as it can reduce or eliminate glass nicking which may lead to microcrack formation and reliability issues over the lifetime of the product. The particular chemical used for stripping will depend on the jacket material. In the case of an acrylate jacket, for example, contact with a concentrated (e.g., about 95 wt %) sulfuric acid solution at 150 to 190° C., for a time effective to completely remove the jacket may be used. The stripping time will depend, for example, on the specific jacket material, thickness, and temperature and concentration of the acid solution. A typical stripping time is from 10 seconds to 90 seconds. The stripped portion of the fiber is next rinsed in deionized water for a time effective to remove residual acid from the fiber, for example, from 45 seconds to two minutes, and the fiber is typically then dried to de-swell the acrylate. The drying may be conducted under ambient conditions, typically for about 60 seconds.

One or more metal layer 8 is formed on the fiber using known techniques, for example, sputtering, evaporation, electroless plating, electrolytic plating, immersion plating, or a combination thereof. At least one of the metal layers is a layer of a transition metal or an alloy thereof, for example, nickel and/or chromium. For purposes of illustration only, an exemplary electroless nickel/electrolytic nickel/gold process will be described.

A first nickel layer is applied to the exposed glass surface of the fiber by an electroless plating process. Typically, the first nickel layer and subsequently deposited metal layers are also deposited over a portion or portions of the jacket 4' adjacent the exposed glass surface, to seal the interface between the cladding and the jacket. The electroless plating process is typically performed as a series of steps including, for example, sensitizing, activating, and plating, although it is possible to combine one or more of these together. The process optionally includes a step in which exposed silica portions of the fiber are first microetched by immersion in an acid such as 10 wt % hydrofluoric acid at room temperature followed by a deionized water rinse. Such a microetch treatment serves to increase adhesion of the seed layer, formed during a subsequent sensitizing step, to the glass surface. This microetch step may optionally be conducted during the sensitizing step, for example, with the stannous fluoride sensitizing process described below.

The optical fiber exposed portion is next immersed into an aqueous sensitizing solution containing a stannous halide such as stannous chloride or stannous fluoride typically at ambient temperature, followed by a deionized water rinse to remove unadsorbed stannous halide. A sensitizer coating is thus formed on the fiber. Stannous chloride and stannous fluoride sensitizing solutions and techniques useful in the invention are known in the art and are described, for example, in U.S. Pat. Nos. 6,355,301 and 5,380,559, respectively, the contents of which are incorporated herein by reference. The stannous chloride solution may, for example, have from 5 g/L to 20 g/L stannous chloride in acidified deionized water containing, for example, 40 mL of 35 wt % hydrochloric acid per liter. The stannous fluoride solution may, for example, have a concentration of about 1 g/L stannous fluoride in water. While the immersion time in the sensitizing bath will depend, for example, on the particular bath chemistry, times of from 3 to 10 minutes are typical. When using a stannous fluoride sensitizing process, the sensitizing and subsequent activation step may be conducted in an inert atmosphere such as a nitrogen atmosphere to extend the lifetime of the baths.

The sensitized portion of the fiber is next immersed in an aqueous activating solution typically at room temperature, followed by a deionized water rinse and drying of the fiber including jacket. During this immersion, the stannous halide sensitizer coating reacts with the activating solution, causing deposition of palladium or other noble metal from the solution over the sensitizer coating. Suitable activating solutions are described, for example, in the aforementioned U.S. Pat. Nos. 5,380,559 and 6,355,301. The activating solution typically is an aqueous solution containing palladium (or other noble metal) chloride and dilute hydrochloric acid, for example, an aqueous solution containing from 0.1 to 10 g/L palladium chloride in dilute aqueous hydrochloric acid. The acid strength is typically from 0.01 M to 0.1 M hydrochloric acid, for example, 0.03 M hydrochloric acid. The immersion time will depend on the bath chemistry, but is typically from 1 to 6 minutes. Suitable activation chemistries and components are commercially available, for example, Ronamerse SMT™ catalyst, from Shipley Company, L.L.C., Marlborough, Mass., USA.

Optionally, portions of the fiber 6 can be masked to prevent metal layer formation thereon during subsequent processing. For example, prevention of metal film formation on the end of the fiber is generally desired. Masking techniques are known in the art and described, for example, in the aforementioned U.S. Pat. Nos. 5,380,559 and 6,355,301. The masking may be accomplished chemically by selective deactivation of previously activated portions of the fiber using, for example, an acidified aqueous solution of stannous halide such as used for sensitizing. Alternatively, the activated portion of the fiber to be masked can be coated with a strippable polymer to provide mechanical deactivation of the fiber. Such a coating can be formed, for example, from a solution composed of KEL-F 800 resin, available from 3M Corporation, in amyl acetate. The coating is dried in moving air at 75° C. for a period of from about five to about ten minutes. Further, there are commercially available plating mask mixtures available.

A first nickel layer is next deposited on the activated portions of the fiber by immersing the activated portions in an electroless nickel plating bath. Suitable components and chemistries are known in the art and described, for example, in the aforementioned U.S. Pat. Nos. 5,380,559 and 6,355,301. Electroless plating chemistries are commercially available, for example, the Everon™ BP electroless plating process from Shipley Company, L.L.C., NIMUDEN SX from Uyemura International Corporation, and type 4865 from Fidelity Chemical Products Corporation, Newark, N.J., USA. These commercial electroless nickel plating chemistries are typically two-part compositions containing nickel sulfate and sodium hypophosphate. A further suitable electroless plating chemistry includes from 30 to 35 g/L of nickel sulfate, from 15 to 20 g/L sodium hypophospite, from 80 to 90 g/L sodium citrate, and from 45 to 55 g/L ammonium chloride, at a temperature from 80 to 90° C. A further electroless nickel plating chemistry is described in U.S. Pat. No. 6,251,252 as containing 1 part sodium fluoride, 80 parts sodium succinate, 100 parts nickel sulfate, and 169 parts sodium hypophosphite with 500 parts deionized water, at a temperature of about 130° F. (54° C.). This first nickel layer functions as a seed layer for the second, electrolytic nickel layer to be formed. The thickness of the first nickel layer is typically from 0.25 to 2 μm so as not to contribute significantly to the overall ductility of the metal structure. After reaching the target film thickness, the fiber is removed from the plating bath and is rinsed with deionized water.

A second nickel layer is next formed over the first nickel layer by immersing the metallized fiber portion into an electrolytic plating bath and electrolytically plating the fiber. The bath typically contains a nickel complex and a nickel salt, for example, from 75 g/L to 400 g/L of nickel as a nickel complex, such as $NiSO_4 \cdot 6H_2O$ or $Ni(NH_2SO_3)_2$ and from 3 g/L to 15 g/L of a nickel chloride salt such as $NiCl_2 \cdot 6H_2O$. The bath may contain from 30 g/L to 45 g/L of a buffer such as boric acid as a buffer salt, and from 0.25 to 2 wt %, for example, from 0.5 to 2 wt %, of a commercially available wetting agent, for example, a perfluorinated quaternary amine wetting agent such as perfluoro dodecyl trimethyl ammonium fluoride. The bath may contain 5 ml/l to 20 ml/l of the wetting agent based on an aqueous solution that contains 10 ppm of the perfluorinated quaternary amine. Further, the bath may contain 30 ppm or less of particular metal impurities, for example, iron, copper, tin, zinc, and lead. The thickness of the second nickel layer is typically from 1 to 6 μm, for example, from 2 to 4 μm or about 3 μm. The bath temperature is typically from 50 to 65° C. If necessary to lower the pH, a 20 wt % diluted sulfamic acid solution may be used. The pH is typically from about 2 to 4.5, for example, from about 2 to 2.5.

A layer of gold or other noble metal such as platinum or palladium is optionally coated over the second nickel layer using known techniques. This layer may be formed over the second nickel layer using immersion plating or electrolytic plating. A typical thickness is less than 1 μm.

The metallized portion of the fiber is next optionally exposed to a chromate solution for enhanced corrosion resistance. The chromate treatment may include, for example, immersion for one minute in a boiling aqueous solution composed of water, 4 g/L chromic acid, 2 g/L nitric acid, and 0.5 g/L sulfuric acid. The fiber is then rinsed in deionized water and blown dry with air.

The metallized portions of the optical fiber are next passivated by phosphonate treatment. While not wishing to be bound by any particular theory, it is believed that a thin adsorbed layer of a phosphonate acting as a protective coating is formed on the outer surface of the metal structure as well as inside the pores of the metal layers, thus acting as a pore blocker. As a result, water vapor contact with the fiber clad can effectively be prevented as can nickel oxidation. Thus, reliability issues due to fiber microcracking and poor solderability can be minimized or eliminated.

The metallized portions of the fiber are immersed, typically at room temperature, in a solution of a chemical compound chosen from one or more of phosphonic acids and their salts (e.g., sodium or potassium phosphonates), and monoesters of phosphoric acids Suitable phosphoric acids include, for example, those of the formula $CH_3(CH_2)_m(CH_2)_nPO(OH)_2$, wherein m is 5, 7, 9 or 11 and n is 0, 1 or 2. An exemplary class of phosphate monoesters useful in the invention are the phosphatidic acids having the formula:

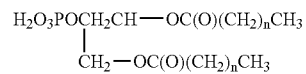

where n is an integer from 10 to 16.

The compounds are typically at least partially fluorinated, for example, with 6 or more fluorinated carbon atoms, for example, from 6 to 14 fluorinated carbon atoms. It is believed that the extent of protection offered by the adsorbed material generally increases with the degree of fluorination. Exemplary fluorinated phosphonic acids include those of the formula $CF_3(CF_2)_m(CH_2)_nPO(OH)_2$, such as $C_8F_{17}SO_2N(CH_2CH_3)C_2H_4PO(OH)_2$ and $CF_3(CF_2)_{11}(CH_2)_2PO(OH)_2$.

The above-described compounds can be used in a solution with a non-corrosive solvent, for example, an alcohol such as methyl, ethyl, and propyl alcohol, chloroform, and the like. The concentration of the compound in the solution is typically from about 1 to about 10 millimoles, for example, from 1 to 5 millimoles or from 2 to 4 millimoles.

The fiber is immersed for a period of time effective to allow bonding of the phosphorus compound to the transition metal, for example, from 10 seconds to 30 minutes. The immersion time will depend, for example, on the specific bath chemistry and the types and thicknesses of the metal layers. The fiber is then rinsed in deionized water and is air-dried.

Figure 2:
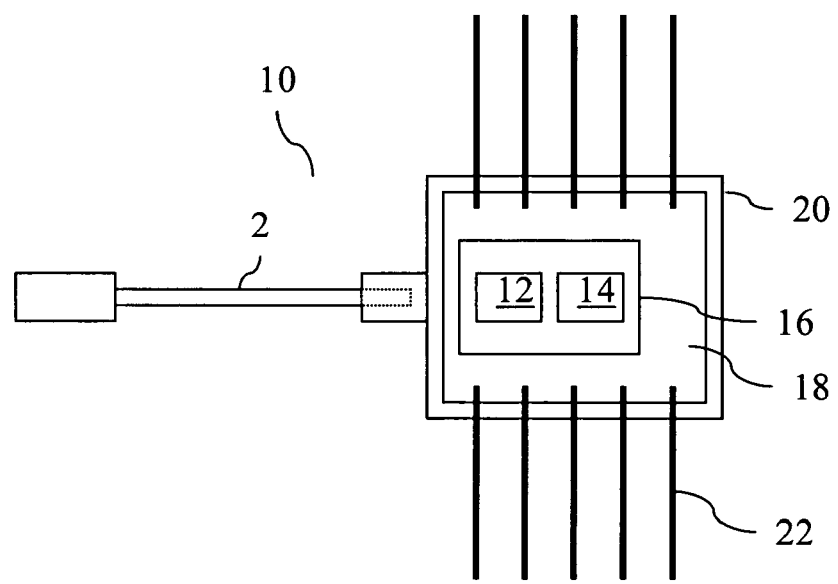
FIG. 2 illustrates an optoelectronic package in accordance with a further aspect of the invention.

In accordance with a further aspect of the invention, optoelectronic packages are provided. The optoelectronic package may be, for example, a butterfly package, a silicon optical bench, or the like. This aspect of the invention will be described with reference to FIG. 2, which illustrates an exemplary butterfly package 10. The package include one or more metallized optical fiber 2 as described above and one or more optoelectronic reference to FIG. 2, which illustrates an exemplary butterfly package 10. The package include one or more metallized optical fiber 2 as described above and one or more optoelectronic device 12, 14. The optical fiber 2 and optoelectronic device 12, 14 are in optical communication with one another, and the package is typically hermetically sealed. The optoelectronic device may be, for example, a laser diode, an LED, a photodetector, a modulator, or a combination thereof. In the exemplified package, the optoelectronic devices are a laser diode 12 and photodetector 14. The optoelectronic devices are bonded to a carrier 16 which may be, for example, a ceramic or silicon. The carrier in turn is bonded to the package casing bottom surface 18. The package casing 20 is typically formed of a metal such as KOVAR, CuW, a ceramic such as a low temperature cold-fired ceramic (LTCC), or a semiconductor such as silicon or gallium arsenide. Leads 22 are provided through the sidewalls of the package casing for providing electrical connection between the package and external components. The package may include other components such as wavelength lockers, backfacet monitors, electrical devices, electronic devices, lenses, mirrors, and the like, which are also bonded to the carrier. The substrate may be bonded to a temperature-regulating device (not shown) such as a thermo-electric cooler (TEC) to control the package temperature. A package lid (not shown) and the metallized fiber 20 are bonded in place through soldering techniques to hermetically seal the package. The metallized optical fiber is aligned to the optoelectronic device, actively or passively, before and/or after being bonded into place.

The following prophetic example is intended to further illustrate the present invention, but is not intended to limit the scope of the invention in any aspect.

EXAMPLE 1

A two meter SMF28 single mode optical fiber, commercially available from Corning Inc., Corning, N.Y., having an acrylate jacket is provided. The acrylate jacket is removed from one end of the fiber over a length of 5 cm by immersion of the fiber end in a 95 wt % sulfuric acid solution at 180° C. for one minute. The exposed end of the fiber is introduced into a deionized water bath for 90 seconds to remove residual acid from the fiber and the fiber and jacket are dried.

The fiber end is next immersed for eight minutes at room temperature in an aqueous stannous chloride sensitizing bath, formed by adding 10 g stannous chloride to 40 mL of 35 wt % hydrochloric acid in deionized water, and diluting to 1 L with deionized water. The fiber end is next rinsed in a deionized water bath for three minutes.

The sensitized fiber end is next immersed for three minutes at room temperature in an aqueous palladium chloride activating bath, formed by adding 0.25 g palladium chloride to 100 mL of 0.3M hydrochloric acid, and diluting to 1 L with deionized water. The activated fiber end is next rinsed in a deionized water bath for five minutes and the fiber including jacket is dried.

An end of the dried fiber is dipped into a strippable polymer to provide a coating protective against the metallization of the end of the fiber, and is dried in moving air at 75° C. for eight minutes.

A layer of nickel is next deposited on the activated fiber surface by electroless plating. The activated portion of the fiber is treated in an electroless nickel solution formed from 1 part sodium fluoride, 80 parts sodium succinate, 100 parts nickel sulfate, and 169 parts sodium hypophosphite with 500 parts deionized water, at a temperature of about 54° C., for a time to form a 0.75 μm nickel coating. The fiber is rinsed in deionized water.

A second layer of nickel 3 μm in thickness is formed over the first layer by electrolytic plating. The electrolytic plating bath is formed by combining 120 g of nickel as a nickel complex, $Ni(NH_2SO_3)_2$, 5 g of a nickel salt ($NiCl_2 6H_2O$), and 30 g of a buffer, $H_3BO_3$, and diluting the mixture to one liter volume with deionized water. 20 mL/L of an aqueous solution containing 10 ppm perfluoro dodecyl trimethyl ammonium fluoride is added to the mixture. The bath temperature is maintained at 60° C. and the bath pH is 2 during plating. The bath is agitated at a rate of 25 cm/sec.

The nickel-coated fiber is next immersed for 10 minutes in an electroless gold plating solution with stirring at 70° C., followed by rinsing in deionized water. The end of the acrylate jacket is blown dry with air at 75° C. for 10 minutes.

The fiber is next immersed in a phosphonic acid bath containing 4 millimolar $C_8F_{17}SO_2N(CH_2CH_3)C_2H4PO(OH)_2$ in ethanol at room temperature for 15 minutes. The fiber is rinsed in deionized water and blown dry with air.

EXAMPLE 2

Example 1 is repeated except using a phosphonic acid bath containing 2 millimolar $CF_3(CF_2)_{11}(CH_2)_2PO(OH)_2$ in ethanol in the final step.

While the invention has been described in detail with reference to specific embodiments thereof, it will be apparent to one skilled in the art that various changes and modifications can be made, and equivalents employed, without departing from the scope of the claims.

What is claimed is:

1. A method of metallizing a non-conductive substrate, comprising:
   (a) providing a non-conductive substrate having an exposed non-conductive surface;
   (b) forming a transition metal layer over the non-conductive surface; and
   (c) exposing the transition metal layer to a liquid solution of a compound chosen from one or more phosphonic acids and their salts, and monoesters of phosphoric acids and their salts, having 6 or more carbon atoms.

2. The method of claim 1, wherein the exposed non-conductive surface is a glass surface.

3. The method of claim 2, wherein the non-conductive substrate is an optical fiber.

4. The method of claim 3, wherein the metal layer is a nickel or nickel alloy layer.

5. The method of claim 3, wherein the compound includes a plurality of hydrocarbon chains.

6. The method of claim 5, wherein the phosphonic acid has the formula:

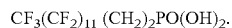
$CF_3(CF_2)_{11}(CH_2)_2PO(OH)_2$.

7. The method of claim 5, wherein the compound is a phosphate monoester of the formula:

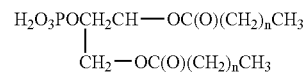
$$H_2O_3POCH_2CH\!-\!OC(O)(CH_2)_nCH_3$$
$$\phantom{H_2O_3POCH_2}|$$
$$\phantom{H_2O_3POC}CH_2\!-\!OC(O)(CH_2)_nCH_3$$

where n is an integer from 10 to 16.

8. The method of claim 3, wherein the compound is at least partially fluorinated.

9. The method of claim 8, wherein the compound is a phosphonic acid having from 6 to 14 perfluorinated carbon atoms.

10. The method of claim 9, wherein the phosphonic acid has the formula:

$CF_3(CF_2)_m(CH_2)_nPO(OH)_2$ wherein m equals 5, 7, 9 or 11, and n equals 0, 1 or 2.

11. The method of claim 9, wherein the phosphonic acid has the formula

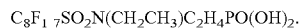
$C_8F_{17}SO_2N(CH_2CH_3)C_2H_4PO(OH)_2$.

12. The method of claim 3, further comprising, prior to (c), exposing the transition metal layer to a chromate solution.

13. The method of claim 3, further comprising prior to (c) forming a metal layer over the nickel or nickel alloy layer.

14. The method of claim 13, wherein the metal layer is formed of a material chosen from gold, palladium, platinum, and alloys thereof.

15. The method of claim 14, wherein the metal layer is formed of gold.

* * * * *